May 30, 1939.　　　　H. F. MALONEY　　　　2,160,597
WINDSHIELD DEFROSTER
Filed Feb. 11, 1938　　　2 Sheets-Sheet 1
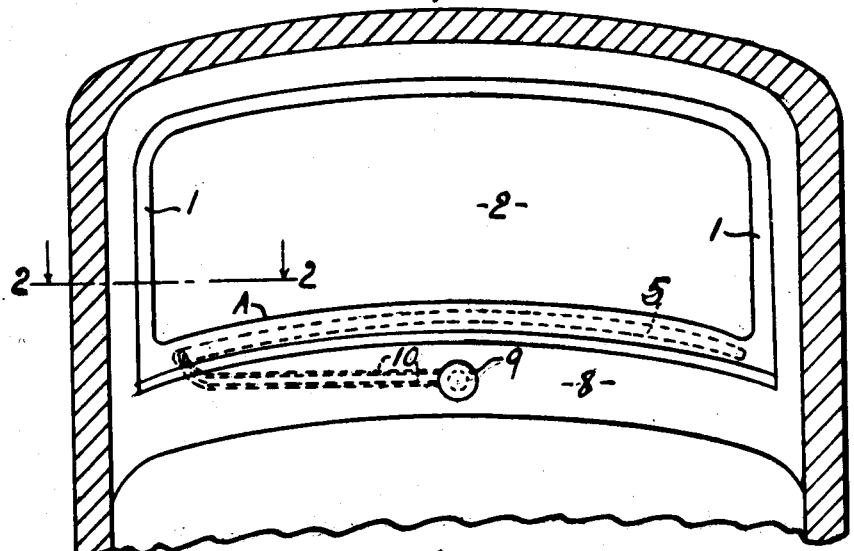
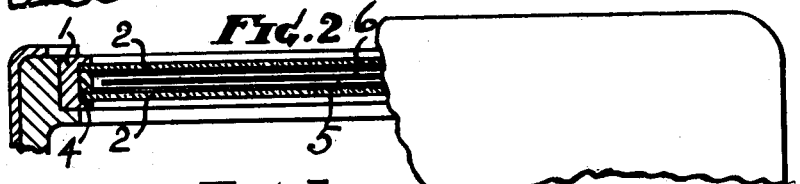
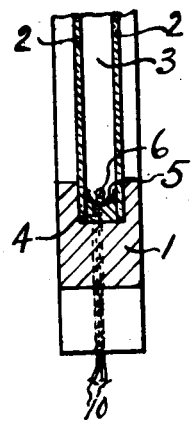
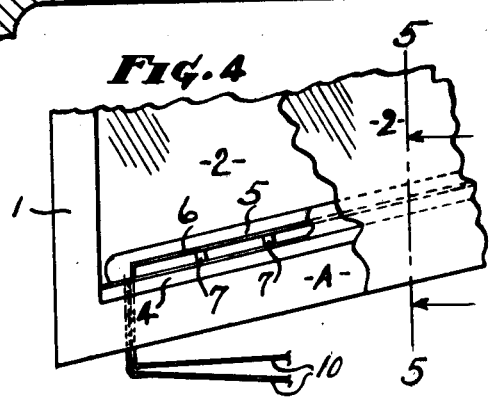
INVENTOR.
HENRY F. MALONEY
BY
ATTORNEY.

May 30, 1939.  H. F. MALONEY  2,160,597
WINDSHIELD DEFROSTER
Filed Feb. 11, 1938  2 Sheets-Sheet 2
Fig. 6
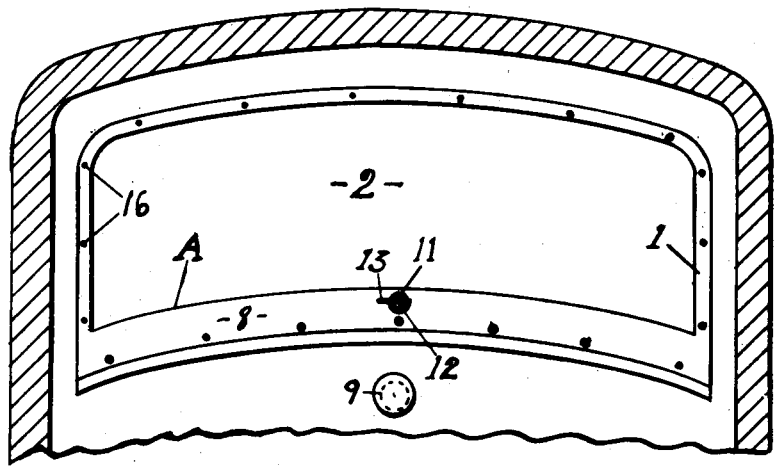
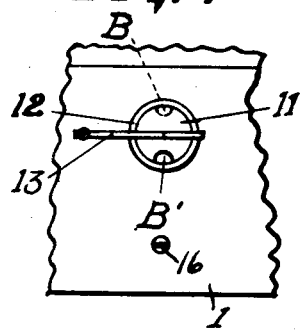
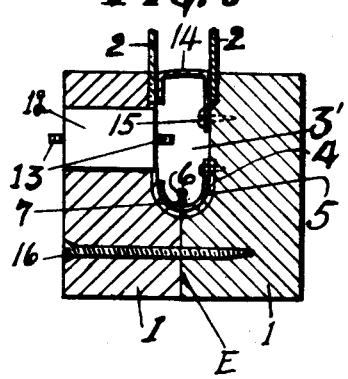
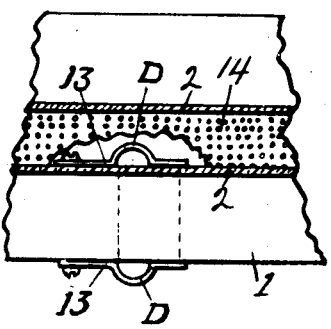
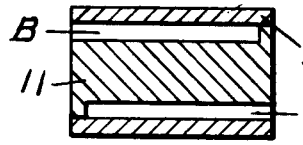
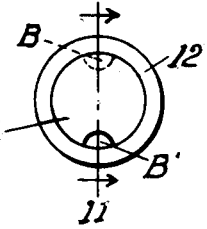
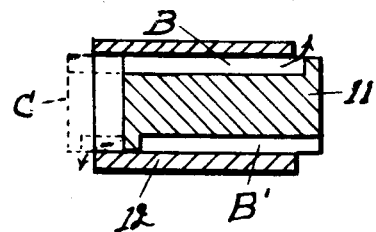
INVENTOR.
HENRY F. MALONEY
BY
ATTORNEY.

Patented May 30, 1939

2,160,597

UNITED STATES PATENT OFFICE 2,160,597

WINDSHIELD DEFROSTER

Henry F. Maloney, Newton, Kans., assignor of one-half to August K. Klein, Halstead, Kans.

Application February 11, 1938, Serial No. 190,059

1 Claim. (Cl. 20—40.5)

My invention relates to a windshield defroster.

The object of my invention is to provide a defroster for the entire surface of the windshield of a motor driven vehicle or the like.

A further object of my invention is to provide a defroster warmed by an electric heating unit, the unit being controlled by a rheostat to vary the temperature according to climatic conditions.

A still further object of my invention is to provide means to conceal the heating unit from direct contact with atmospheric condition.

A still further object of my invention is to provide a windshield having a pair of glass sheets spaced apart and carried by an appropriate frame air tight and properly insulated, the space between said sheets functioning as a heating chamber in which an electrically heated element is installed and controlled externally by a rheostat, the said unit being energized by the battery of the vehicle.

These and other objects will hereinafter be more fully explained, reference being had to the accompanying drawings, and in which like characters will apply to like parts in the different views.

Referring to the drawings:

Fig. 1 is an inside elevation of a windshield as installed in the body of a vehicle, the latter being in cross section, fragmentarily shown.

Fig. 2 is a plan view of Fig. 1, parts removed for convenience of illustration, taken on line 2—2 in Fig. 1.

Fig. 3 is a similar view to Fig. 2, enlarged and confined to one corner of the structure.

Fig. 4 is an elevation of Fig. 3, parts removed for convenience of illustration.

Fig. 5 is a sectional view taken on line 5—5 in Fig. 4.

Fig. 6 is an inside elevation of the windshield with respect to the body of the vehicle, showing the position of the valve.

Fig. 7 is an enlarged end view of the valve as positioned in the sash, the latter fragmentarily shown.

Fig. 8 is a transverse sectional view through the sash taken at the diametrical axis of the valve.

Fig. 9 is a plan view of Fig. 7, parts removed for convenience of illustration.

Fig. 10 is an end view of the valve.

Fig. 11 is a sectional view taken on line 11—11 in Fig. 10, showing the valve normally closed.

Fig. 12 is a similar sectional view to Fig. 11, showing the valve movement.

My invention herein disclosed consists of a windshield sash 1, properly mounted in the frame of a vehicle, the said sash being glazed with a pair of glass sheets 2, spaced apart, and means to secure the said glass therein, by which means a heating chamber 3 is formed.

As a means to secure said sheets of glass, spaced apart, I have placed therebetween a fireproof element 4, preferably made of asbestos, in view of its nonflammable character and flexing sufficient for air tight purpose; furthermore a satisfactory antirattle function is the result, it being understood that the said asbestos element is continuous peripherally seating in the groove formed in the sash 1.

Positioned adjacent the bottom rail A, and resting upon the said asbestos member is a metallic arcuate trough 5, functioning as a conduit in which is positioned an electrically heated unit 6, said unit being supported at intervals by insulation plugs 7, as spacing means for the said unit from the trough, regardless of the alignment of said bottom rail, some of which are crowned upward or slanting outward from each end thereof to a medial apex, at which point a bar may be arranged to receive the glass securely as above described, the latter form for the windshield not being shown in the drawings; furthermore, a heating unit for each side of the apex with separate control may be provided.

Positioned on the instrument board 8 is a rheostat 9, to vary the temperature of the said heating element connected thereto by a current line 10, as shown in Figs. 1 and 4, it being understood that a feeder connects the rheostat to the battery of the vehicle, and the said heating unit or units being grounded to the trough.

In Figs. 4 and 5 is shown the method by which the heating unit is practically obscured from view of the driver of the vehicle, this being an advantage, as said unit maintains a low degree of illumination, which otherwise would be confusing for night driving, should the unit be placed at or above the upper edge of the said bottom rail.

The automatic control for expansion and contraction between the said glass sheets of the windshield consists of a valve 11, cylindrical in form and having grooves B and B' oppositely positioned with respect to the diametrical axis of the valve, and the said grooves extend from the respective ends of the valve oppositely, and each terminating a spaced distance inward from the ends thereof respectively, and the said valve is adapted to slidably engage in a sleeve 12, the said sleeve being secured in an aperture extending through from the outside of the sash to the heating chamber, so that the grooves of the valve will communicate with the heating chamber and exterior when the valve is moved longitudinally in the sleeve, by which means the expansion and contraction is relieved in the heating chamber as the valve is automatically moved inward or outward as conditions require. In other words, when the said chamber is heated, expansion takes place, in which condition the valve is forced outward as shown by dotted lines C in Fig. 12, in which instance groove B' will communicate with the exterior of the sash as an exhaust, and as the chamber cools, contraction occurs, causing the valve to move inward, so that groove B will communicate with the chamber to overcome a vacuum by an intake through said groove, the air flow being indicated by arrows in Fig. 12.

As a means to insure the valve being normally closed and permit the same to move in either direction, I have provided a spring element 13 for each end thereof as influenced by expansion or contraction, the free end of each spring adapted to seat on its respective end of the sleeve as a stop to insure normally closed position of the valve as tensioned by the spring, and the said springs each having a medial portion arced outward to avoid contact with the edge of the valve in its reciprocating movement.

As an alternate to close from view the said heating element and also as a tensioning means to cause snug engagement of a marginal portion adjacent the lower edge of each glass panel, I have placed between said glass panels a finely perforated element 14, said element being channeled in form with respect to cross section, one leg of which is secured to the sash rail by screws 15, spaced therealong, and the said sash, being divided on line E as shown in Fig. 8, is accessible means to the said glass panels and heating elements by removing one portion of the sash as secured by screws 16 spaced therearound. It will be understood that the channel is perforated only along its web portion that is horizontally positioned, and through which heat will circulate from the said heating element, passing upward between said sheets, and the valve being free to act as energized by expansion and contraction.

While I have shown and described a straight aligned element for the heating unit, the same may be coiled or otherwise formed, and in event of the heating element for each side of the windshield, separate rheostats are employed whereby, selectively, either half may be defrosted, and such other modification may be employed as lie within the scope of the appended claim.

This application is a continuation-in-part of my copending application, Serial No. 102,831, filed Sept. 28, 1936.

Having fully described my invention, what I claim as new and desire to secure by Letters Patent is:

A structure of the character described comprising a windshield for motor vehicles formed by two identical sheets of glass spaced apart throughout their areas, a frame for said sheets, spacing means in the frame for said sheets formed by a resilient sealing material, said sheets and said frame forming an air tight chamber, a metallic substantially U-shaped channel member positioned in the lower part of the frame for substantially its entire width, an electrical heating element arranged in said channel and extending for the major part of the length of said channel, means for insulating said heating element from the channel, said heating element positioned in said channel in a manner to lie wholly below the lower portion of the windshield frame, a light guard arranged entirely over the channel member for completely covering the said heating element, said guard having closely arranged, relatively fine openings formed therein over its entire surface, said openings being of such size as to prevent the passage of light rays therethrough from the heating element, a valve member for establishing communication from the exterior to the interior of the heating chamber, said valve comprising a cylindrical casing open at both ends, a piston sliding therein, leaf springs engaging the opposite ends of the piston for normally holding it intermediate the length of the cylinder, oppositely arranged longitudinal ports formed in the walls of the piston, said piston when in one position under the action of a contraction of the air in the heating chamber permitting the flow of air to said heating chamber, said piston when in the opposite position under the action of an expansive movement in the heating chamber permitting air to be discharged from said heating chamber, substantially as shown and described.

HENRY F. MALONEY.